(12) United States Patent
Nocon et al.

(10) Patent No.: US 10,988,254 B2
(45) Date of Patent: Apr. 27, 2021

(54) SYSTEMS AND METHODS TO CONTROL SOUNDS PRODUCED BY A REMOTE CONTROLLED VEHICLE DURING OPERATION OF THE REMOTE CONTROLLED VEHICLE

(71) Applicant: Disney Enterprises, Inc., Burbank, CA (US)

(72) Inventors: Nathan Nocon, Burbank, CA (US); Clifford Wong, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 207 days.

(21) Appl. No.: 16/267,176

(22) Filed: Feb. 4, 2019

(65) Prior Publication Data

US 2020/0247537 A1    Aug. 6, 2020

(51) Int. Cl.
| | | |
|---|---|---|
| *B64C 39/02* | (2006.01) | |
| *G05D 1/00* | (2006.01) | |
| *G06F 3/0484* | (2013.01) | |
| *G06F 9/30* | (2018.01) | |

(52) U.S. Cl.
CPC ......... *B64C 39/024* (2013.01); *G05D 1/0038* (2013.01); *G06F 3/04847* (2013.01); *G06F 9/30003* (2013.01)

(58) Field of Classification Search
None
See application file for complete search history.

(56) References Cited

U.S. PATENT DOCUMENTS

| | | | |
|---|---|---|---|
| 9,646,597 B1 * | 5/2017 | Beckman | G10K 11/1783 |
| 2017/0039859 A1 * | 2/2017 | Hu | G08G 5/0034 |
| 2019/0189016 A1 * | 6/2019 | Kubie | B64C 39/024 |
| 2019/0297462 A1 * | 9/2019 | Aljadeff | H04W 4/029 |

* cited by examiner

*Primary Examiner* — Jonathan M Dager
*Assistant Examiner* — Garrett F Evans
(74) *Attorney, Agent, or Firm* — Esplin & Associates, PC (57) ABSTRACT

Systems and methods control sounds produced by a remote-controlled vehicle during operation of the remote-controlled vehicle are described herein. One or more components of the remote-controlled vehicle may be controlled and/or manipulated so that the remote-controlled vehicle produces sounds during operation that match a predetermined set of sounds. The control and/or manipulation of the one or more components of the remote-controlled vehicle may be effectuated without alternating a path of the remote-controlled vehicle.

18 Claims, 5 Drawing Sheets

SYSTEMS AND METHODS TO CONTROL SOUNDS PRODUCED BY A REMOTE CONTROLLED VEHICLE DURING OPERATION OF THE REMOTE CONTROLLED VEHICLE

FIELD OF THE DISCLOSURE

This disclosure relates to controlling sounds produced by a remote-controlled vehicle during operation of the remote-controlled vehicle.

BACKGROUND

Remote-controlled vehicles, such as multi-copters, are popular for recreation. The sounds of multi-copters propellers during operation can be loud and annoying.

SUMMARY

One aspect of the disclosure relates to a system configured to control sounds produced by a remote-controlled vehicle during operation of the remote-controlled vehicle. In accordance with one or more implementations, resultant sound from a remote-controlled vehicle propellers and/or other components may be controlled to make a predetermined set of sounds rather than noise. By way of non-limiting illustration, the rotational speed of the propellers may be set to match a particular pitch and/or tone at specific points in time. Active actuators may manipulate the vehicle's thrust to control position and/or orientation. Position of the remote-controlled vehicle may be directly dependent on propeller rotation per minute. In order to decouple sound from thrust, active actuators may be utilized.

In some implementations, one or more configurations of one or more components of the remote-controlled vehicle may be controlled to make a predetermined set of sounds. In some implementations, control of components of the remote-controlled vehicle may be performed without altering the remote-controlled vehicle's navigation path. In some implementations, a group of remote-controlled vehicles may be controlled to operate individually in a given musical key or chords via one or more components to produce sounds indicative of a song. Other aspects of the remote-controlled vehicles may be controlled to make a predetermined set of sounds (e.g. beeps, buzzing, tones from vibrating motors, etc.).

An implementation of the system may comprise one or more of a remote-controlled (RC) vehicle, a user interface, one or more physical processors, and/or other components. The remote-controlled vehicle may comprise one or more of a flying vehicle, a terrestrial vehicle, a subsurface water vehicle, a surface water vehicle, and/or other remoted-controlled vehicles. The remote-controlled vehicle may include individual components and/or sets of components configured to be adjusted.

The user interface may be configured to generate output signals in accordance with user input. The user input may be facilitated by user interaction with the user interface. The user interface may include one or more input interfaces. The one or more input interfaces may include one or more of a touch-sensitive display, one or more physical input mechanisms (e.g., one or more joysticks and/or one or more buttons, and/or other devices to received user input). The output signals may convey operation control information and/or other information. The operation control information may include control signals that dictate a path of the remote-controlled vehicle. The path may be dictated by one or more of an amount of thrust, a direction of travel, an orientation, and/or other aspects of control of a remoted controlled vehicle.

The one or more physical processors may be configured by machine-readable instructions. The one or more physical processors may be coupled to one or more of the user interface, the remote-controlled vehicle, and/or other devices. In some implementations, the one or more physical processors may be a standalone device. Executing the machine-readable instructions may cause the one or more physical processors to facilitate controlling sounds produced by the remote-controlled vehicle during operation of the remote-controlled vehicle. The one or more physical processor may include one or more computer program components. The one or more computer program components may include one or more of a sound component, a control component, a feedback component, and/or other components.

The sound component may be configured to obtain sound profile information and/or other information. The sound profile information may specify associations between configurations of components of the remote-controlled vehicle and one or more values of one or more attributes of sound produced by the remote-controlled vehicle during operation of the remote-controlled vehicle. By way of non-limiting illustration, the sound profile information may specify one or more of a first association between a first configuration of components of the remote-controlled vehicle and a first value of a first attribute of sound, a second association between a second configuration of components of the remote-controlled vehicle and a second value of the first attribute of sound, and/or other association.

The sound component may be configured to obtain sound production information and/or other information. The sound production information may specify a set of sounds to be produced by the remote-controlled vehicle during operation of the remote-controlled vehicle.

The control component may be configured to obtain operation control information, and/or other information. The operation control information may include control signals that dictate a path of the remote-controlled vehicle. The path may be dictated by one or more of an amount of thrust, a direction of travel, an orientation, and/or other aspects of navigation control of a remoted controlled vehicle.

The control component may be configured to generate sound control information and/or other information. The sound control information may include sound control signals that dictate changes in the configurations of the components of the remote-controlled vehicle to cause the remote-controlled vehicle to produce the sounds included in the set of sounds during operation without altering the path of the remote-controlled vehicle. By way of non-limiting illustration, the changes in the configurations of the components of the remote-controlled vehicle may be effectuated without altering one or more of an amount of thrust, a direction of travel, an orientation of the remote-controlled vehicle, and/or other aspects of the control of the remote-controlled vehicle along a path.

The control component may be configured to effectuate transmission of the sound control signals to the remote-controlled vehicle so that the remote-controlled vehicle produces the sounds in the set of sounds during operation without altering the path of the remote-controlled vehicle. By way of non-limiting illustration, responsive to the set of sounds including sound having the first value of the first attribute, the control component may effectuate transmission of a first sound control signal and/or other control signals to the remote-controlled vehicle. The first sound control signal and/or other sound control signals may cause the remote-controlled vehicle to be configured in the first configuration to produce sound having the first value of the first attribute. By way of non-limiting illustration, responsive to the set of sounds including sound having the second value of the first attribute, the control component may effectuate transmission of a second sound control signal and/or other sound control signals to the remote-controlled vehicle to cause the remote-controlled vehicle to be configured in the second configuration to produce sound having the second value of the first attribute.

The feedback component may be configured to obtain output signals from the one or more sensors conveying audio information and/or other information. The audio information may define sounds being produced by the remote-controlled vehicle during operation. The feedback component may be configured to compare the audio information to the set of sounds to be produced by the remote-controlled vehicle during operation of the remote-controlled vehicle. The feedback component may be configured to determine differences between the audio information and the set of sounds. The feedback component may be configured to effectuate transmission of one or more additional sound control signals to the remote-controlled vehicle so that the configurations of the components of the remote-controlled vehicle are changed to reduce and/or eliminate the differences.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
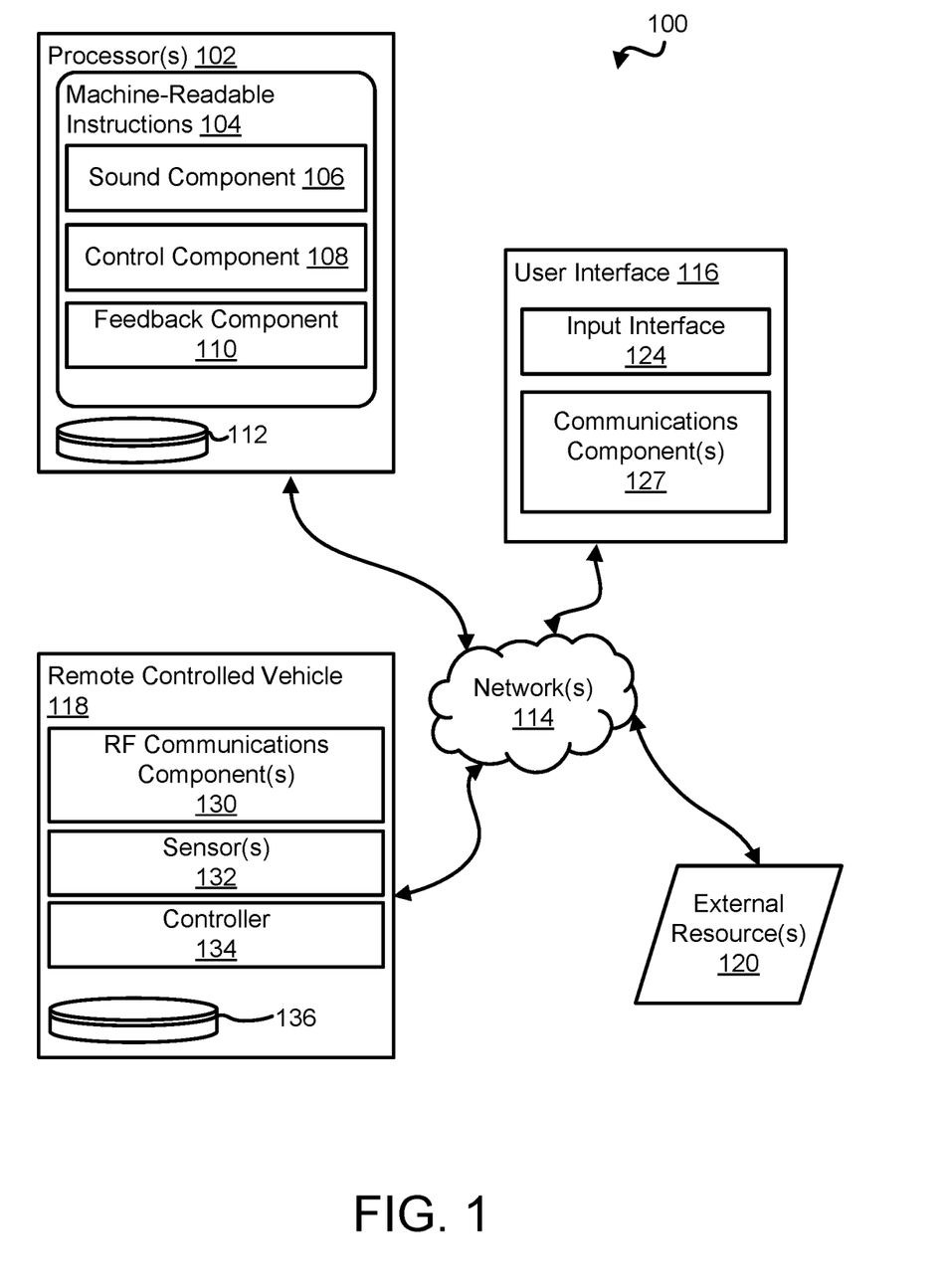
FIG. 1 illustrates a system configured to control sounds produced by a remote-controlled vehicle during operation of the remote-controlled vehicle, in accordance with one or more implementations.

FIG. 1 illustrates a system 100 configured to control sounds produced by a remote-controlled vehicle during operation of the remote-controlled vehicle. In some implementations, one or more configurations of one or more components of the remote-controlled vehicle may be controlled to make a predetermined set of sounds.

In some implementations, the system 100 may comprise one or more of one or more physical processors 102, one or more user interfaces, one or more remoted-controlled vehicles, and/or other components. The one or more user interfaces may include user interface 116. The one or more remote-controlled vehicle may include remote-controlled vehicle 118.

The remoted-controlled (RC) vehicle 118 may comprise one or more of a flying vehicle, a terrestrial vehicle, a subsurface water vehicle, a surface water vehicle, and/or other remoted-controlled vehicles. By way of non-limiting example, remote-controlled vehicle 118 may comprise one or more of a RC helicopter, an RC multi-copter, an RC airplane, an RC car or truck, an RC motorcycle, an RC submarine, an RC boat, an RC hovercraft, and/or other remoted-controlled vehicles. Individual ones of the above listed RC vehicles may include one or more of one or more structural components, one or more drive components, one or more sound-specific components, and/or other components. The one or more structural components of a remote-controlled vehicle may be configured to mechanically connect and/or engage components together to form the remote-controlled vehicle. The one or more drive components may be configured to propel the remote-controlled vehicle along a navigation path.

By way of non-limiting example, one or more drive components of a flying vehicle may include one or more of one or more motors, one or more power and/or fuel sources, one or more propellers, one or more fixed wings, one or more ailerons, one or more jet propulsion components, one or more gear boxes, and/or other components. One or more structural components of a flying vehicle may include one or more of a body, a frame, one or more arm members, one or more mounting components, and/or other components. The one or more arm members may attach one or more drive components to the body and/or frame. The one or more mounting components may attach individual drive components to individual ones of the one or more arm members. One or more drive components of a terrestrial vehicle may include one or more of one or more motors, one or more power and/or fuel sources, one or more wheels, one or more steering components, and/or other components. One or more structural components of a terrestrial vehicle may include one or more of a body, a frame, one or more arm members, one or more mounting components, and/or other components. One or more drive components of a subsurface water vehicle and/or surface water vehicle may include one or more of one or more motors, one or more power and/or fuel sources, one or more propellers, one or more fans, and/or other components. One or more structural components of a subsurface water vehicle and/or surface water vehicle may include one or more hulls, one or more ballasts, one or more arm members, one or more mounting components, and/or other components.

In some implementations, changing configurations of individual components and/or sets of components may refer to effectuating one or more mechanical adjustments, one or more electrical adjustments, and/or other changes. Mechanical adjustments may include one or more of lengthening a component, shortening an individual component, increasing a spacing between components in a set of components, decreasing spacing between components in a set of components, rotating an individual component, re-orienting component attitudes, re-positioning components, and/or other adjustments. Electrical adjustments may refer to one or more of supplying more power (e.g., voltage and/or amperage) to a component (e.g., to make it operate faster), reducing the supply of power to the component (e.g., to make it operate slower), pulse width modulated signals, and/or other electrical adjustments.

In some implementations, the one or more sound-specific components may include one or more devices configured to produce specific sounds, tones, and/or other noises. A sound-specific component may be musical instrument and/or musical instrument component. A sound-specific component may be configured to produce sounds, tones and/or other noised by virtue of the flow of fluid (air and/or water) over, through, and/or nearby the sound-specific component. By way of non-limiting illustration, a sound-specific component may include one or more of a whistle, a harmonica, a woodwind (e.g., flutes, oboes, clarinets, and/or bassoons), a stringed instrument (with vibration induced by flow of fluid over a string), a brass instrument, components thereof, and/or other devices. Individual sound-specific components may be positioned at or near a portion of an remote-controlled vehicle where air flow may be expected to pass by and/or be drawn towards. By way of non-limiting illustration, for a flying vehicle, a sound-specific component may be positioned at or near a propeller to actively encounter air flow. By way of non-limiting illustration, for a flying vehicle, a sound-specific component may be position at or near a location where the component may passively encounter air flow during flight.

It is noted that the above description of various components and configurations is provided for illustrative purposes only and is not to be considered limiting. For example, in some implementations, one or more RC vehicles may be of other form factors and/or may include one or more other components.

The sounds produced by remote-controlled vehicle 118 may be attributed to one or more of operation of components of remote-controlled vehicle 118, sounds resulting from air passing by or through components of remote-controlled vehicle 118, and/or other aspects of operation of remote-controlled vehicle 118 that may cause the production of sound. Components of remote-controlled vehicle 118 that may produce sound during operation may include drive components and/or other components. By way of non-limiting illustration, the running of one or more of a motor, an actuator, a gearbox, and/or other drive components may produce sounds. By way of non-limiting illustration, changing a speed of a motor (e.g., the configuration of the motor) may cause the produced sound to change. Air may pass through, or by, one or more components of remote-controlled vehicle 118 to cause sounds to be produced. By way of non-limiting illustration, remote-controlled vehicle 118 may include one or more propellers that provide thrust by driving air in a certain direction. The air may pass over one or more structural components which may cause a sound to be produced.

In some implementations, remote-controlled vehicle 118 may include one or more of one or more radio frequency communication components 130, one or more sensors 132, a controller 134, electronic storage 136, and/or other components.

The one or more radio frequency communication components 130 may include one or more of hardware, software, and/or other components configured to facilitate the wireless communication of information to and/or from remote-controlled vehicle 118. By way of non-limiting example, the one or more radio frequency communication components 130 may include one or more of a receiver, transmitter, transceiver, and/or other components. The one or more radio frequency communication components 130 may be configured to emit and/or receive radio signals (e.g., electromagnetic waves) conveying information.

The one or more sensors 132 may include one or more of one or more audio sensors, one or more inertial navigation sensors, one or more vibration sensors, one or more barometric pressure sensors, a global positioning system (GPS), and/or other sensors.

An audio sensor may be configured to receive audio input. The audio sensor may be configured to generate output conveying audio information and/or other information. The audio information may define sounds produced by the remote-controlled vehicle during operation. An audio sensor may include a sound transducer and/or other sensor configured to convert sound (e.g., air pressure variation) into an electrical signal. By way of non-limiting illustration, an audio sensor may include a microphone. In some implementations, individual audio sensors may be positioned at various locations on remote-controlled vehicle 118 that produce sounds during operation. By way of non-limiting illustration, individual audio sensors may be positioned at locations of individual drive components and/or other components.

An inertial navigation sensor may be configured to generate output signals conveying motion and rotation information. Motion and rotation information may specify acceleration and/or orientation of the device with respect to gravity and/or earth's magnetic fields.

A vibration sensor may be configured to generate output signals conveying vibration information. Vibration information may specify a frequency of vibration experienced by a body on which the vibration sensor may be mounted.

A barometric pressure sensor may be configured to generate output signals conveying altitude information. Altitude information may specify the height of the device in relation to sea level.

A global positioning system may be configure to generate output signals conveying localization information. Localization information maybe may specify position and velocity of the device the world in addition to time of day.

The controller 134 may comprise one or more of hardware, software, and/or other components configured to control one or more components of remote-controlled vehicle 118. By way of non-limiting example, controller 134 may be configured to perform one or more of obtaining operation control information including control signals that dictate a path of the remote-controlled vehicle 118, controlling one or more components of remote-controlled vehicle 118 in accordance with control signals to maneuver remote-controlled vehicle 118 along the path, obtaining sound control information including sound control signals that dictate changes in configurations of the components of remote-controlled vehicle 118 to cause remote-controlled vehicle 118 to produce the certain sounds without altering the path, controlling one or more components of remote-controlled vehicle 118 in accordance with sound control signals to effectuate the changes in the configurations of the components of remote-controlled vehicle 118, and/or other operations. In some implementations, the one or more physical processors 102 described herein may be included in controller 134.

The one or more radio frequency communication components 130 may be configured to receive control signals communicated to remote-controlled vehicle 118 from one or more sources (e.g., user interface 116 and/or control component 108 of one or more processors 102). The controller 134 may obtain the signals from the one or more radio frequency communication components 130. The controller 134 may implement the control signals to control one or more components of remote-controlled vehicle 118 (e.g., drive components, structural components, and/or other components).

The remote-controlled vehicle 118 may include one or more of one or more structural components, one or more drive components, and/or other components. The one or more structural components of may be configured to mechanically connect and/or engage components together to form the remote-controlled vehicle 118. The one or more drive components may be configured to propel the remote-controlled vehicle along a navigation path. By way of non-limiting example, one or more drive components may include one or more of one or more motors, one or more power and/or fuel sources, one or more propellers, and/or other components. One or more structural components may include one or more of a body, a frame, one or more arm members, one or more mounting components, and/or other components. The one or more arm members may attach one or more drive components to the body and/or frame. The one or more mounting components may attach individual drive components to individual ones of the one or more arm members. Examples of components of remote-controlled vehicle 118 are shown and described in more detail herein with reference to FIGS. 3-10.

In FIG. 1, user interface 116 may be configured to facilitate user interaction with one or more components of system 100. The user interface 116 may include a physical interface. The user interface 116 may be handheld. By way of non-limiting illustration, the user interface 116 may be a handheld controller. User interface 116 may include one or more of an input interface 124, one or more communications components 127, and/or other components.

The input interface 124 may comprise one or more components configured to generate output signals conveying operation control information and/or other information. The operation control information may include control signals to dictate a path of remote-controlled vehicle 118. The input interface 124 may include one or more of an electro-mechanical input mechanism (e.g., a joystick, actuators, buttons, a keypad, and/or other input mechanisms), one or more sensors, an image-based motion sensing device, a voice recognition device (e.g., configured to facilitate voice command prompting), and/or other components.

The one or more communication components 127 may include one or more of hardware, software, and/or other components configured to facilitate the wireless communication of information to and/or from user interface 116. By way of non-limiting example, the one or more communication components 130 may include one or more of a receiver, transmitter, transceiver, and/or other components. One or more of the one or more communication components 130 may be configured to emit and/or receive radio signals (e.g., electromagnetic waves).

Although the one or more physical processors 102 are shown as a standalone entity in FIG. 1, this is for illustrative purposes only and is not to be considered limiting. In some implementations, one or more physical processors 102 may be coupled to, or included in, one or more of the user interface 116, the remote-controlled vehicle 118, and/or other devices. In some implementations, the one or more physical processors 102 may be a standalone device.

The one or more physical processors 102 may include and/or may otherwise be coupled to electronic storage 112. The electronic storage 112 may be configured to store one or more of sound profile information, operation information, and/or other information.

The sound profile information may specify associations between configurations of components of the remote-controlled vehicle 118 and one or more values of one or more attributes of sound produced by the remote-controlled vehicle during operation of the remote-controlled vehicle. In some implementations, the associations may change depending on a particular operation mode of remote-controlled vehicle 118. An operation mode may include one or more of take-off, landing, acceleration, deceleration, constant velocity, and/or other operation modes. By way of non-limiting illustration, the sound profile information may specify one or more of a first association between a first configuration and a first value of a first attribute (and/or other values of other attributes) of sound, a second association between a second configuration and a second value of the first attribute (and/or other values of other attributes) of sound, and/or other associations. In some implementations, the first association may be specific to a first operation mode of the remote-controlled vehicle 118. For example, the first association may associate the first configuration with the first value of the first attribute during a first operation mode of the remote-controlled vehicle 118. The sound profile information may specify a third association between the first configuration and a third value of the first attribute during a second operation mode of the remote-controlled vehicle 118. By way of non-limiting illustration, remote-controlled vehicle 118 in the first configuration may produce a difference sound during take-off than during landing.

In some implementations, the one or more attributes of sound may include one or more of pitch, tone, volume, key, timbre, intensity, and/or other attributes of sound. The values of the attributes may specify the quality of the sound attribute produced, and/or other information. The values may be quantitative and/or qualitative.

By way of non-limiting illustration, a value of a pitch attribute may specify a frequency of sound produced. In some implementations, the value may be specified as a qualitative value such as one or more of "high," "mid," "low" and/or other descriptive terms. In some implementations, the value may be specified as a quantitative value such as a measurement in terms of Hertz.

By way of non-limiting illustration, a value of a tone attribute may specify a tonal quality of sound produced. In some implementations, the value may be specified as a qualitative value such as one or more of "high," "mid," "low," "low-rising," "falling," and/or other descriptive terms. In some implementations, the value may be specified as a quantitative value such as a measurement in terms of Hertz.

By way of non-limiting illustration, a value of a volume attribute may specify a quantity or power of sound produced.

In some implementations, the value may be specified as a qualitative value such as one or more of "high," "mid," "low," and/or other descriptive terms. In some implementations, the value may be specified as a quantitative value such as a measurement in terms of decibels.

By way of non-limiting illustration, a value of a key attribute may specify a musical key of sound produced. In some implementations, the value may be specified as a qualitative value such as one or more of "key of G," "key of C," and/or other descriptive terms. In some implementations, the value may be specified as a quantitative value such as a measurement in terms of harmonic frequency.

By way of non-limiting illustration, a value of a timbre attribute may specify a perceived sound quality of sound produced. The physical characteristics of sound that may determine the perception of timbre may include one or both of spectrum and envelope.

By way of non-limiting illustration, a value of an intensity attribute may specify a sound power per unit area of sound produced. In some implementations, the value may be specified as a qualitative value such as one or more of "high," "mid", "low," and/or other descriptive terms. In some implementations, the value may be specified as a quantitative value such as a measurement in terms of sound waves per unit area.

In some implementations, an individual value may be specified in terms of a system defined value (e.g. normalized number, one or more bytes, etc.) as limited by one or more of software, hardware, and/or communication protocol definitions.

In some implementations, determining sound profile information may be accomplished by measuring sounds produced by individual components and/or sets of components of remote-controlled vehicle 118 during operation. Measuring sounds may be facilitated by one or more sensors 132 positioned throughout remote-controlled vehicle 118. Determining sound profile information may be accomplished by measuring sounds produced by individual components and/or sets of components of remote-controlled vehicle 118 during operation while varying configurations of the individual component and/or sets of components of remote-controlled vehicle 118. The measured sounds may be associated with one or more of specific configurations of individual components and/or sets of components, operational modes of the remote-controlled vehicle 118, and/or other information about the remote-controlled vehicle 118. In some implementations, determining sound profile information may be accomplished by measuring sounds produced by individual components and/or sets of components of remote-controlled vehicle 118 in isolation. By way of non-limiting illustration, sounds produced by individual components and/or sets of components may be measured individually during individual operation of the individual components and/or sets of components.

The operation information may specify an effect the individual configurations of individual components and/or sets of components may have on operation of the remote-controlled vehicle 118. It may be desired to change configurations of components of remote-controlled vehicle 118 without affecting the navigation of remote-controlled vehicle 118 along a path. The operation information may specify associates between individual configurations of individual components and/or sets of components and an effect the individual configurations may have on operation. With such information being known, counteractive control measures may be taken to ensure the effect is dampened, if not eliminated. Control measures may be active and/or passive based on the orientation of the vehicle. By way of non-limiting illustration, operation information may specify a first association between the first configuration of an individual component and/or individual set of components and a first effect on operation. By way of non-limiting illustration, the first effect may include causing the remote-controlled vehicle 118 to translate in a first direction and/or other effect. With this information, if it is determined that the first configuration is desired to produce a particular sound, then operation of remote-controlled vehicle 118 may be adjusted to counteract the translation in the first direction. By way of non-limiting illustration, one or more drive components may be controlled to cause the remote-controlled vehicle 118 to translate in a second direction opposite the first direction thereby counteracting the effect of causing remote-controlled vehicle 118 to be in the first configuration.

In some implementations, determining operation information may be accomplished by measuring and/or monitoring the operation of remote-controlled vehicle 118 while varying configurations of components of remote-controlled vehicle 118. The remote-controlled vehicle 118 may be operated to follow a predetermined path. One or more effects on remote-controlled vehicle's 118 ability to maintain navigation along the path may be measured and recorded while configurations of individual components and/or individual sets of components are changed. For example, individual deviations off of the path caused by individual configurations may be measured and recorded as individual effects on operation.

The one or more physical processors 102 may be configured by machine-readable instructions 104. Executing the machine-readable instructions 104 may cause the one or more physical processors 102 to facilitate controlling sounds produced by remote-controlled vehicle 118 during operation of the remote-controlled vehicle 118. The machine-readable instructions 104 may include one or more of a sound component 106, a control component 108, a feedback component 110, and/or other components.

The sound component 106 may be configured to obtain sound profile information and/or other information. The sound profile information may be obtained from electronic storage 112 and/or other storage location.

The sound component 106 may be configured to obtain sound production information and/or other information. The sound production information may specify a set of sounds to be produced by remote-controlled vehicle 118 during operation of the remote-controlled vehicle 118. In some implementations, the individual sounds in the set of sounds may be played in a temporal order to produce a song.

The control component 108 may be configured to obtain operation control information, and/or other information. The operation control information may include control signals that dictate a path of the remote-controlled vehicle 118. The path may be dictated by one or more of an amount of thrust, a direction of travel, an orientation, and/or other aspects of navigation control. The operation control information may be obtained from user interface 116 and/or other source. By way of non-limiting illustration, the operation control information may be derived from user input into input interface 124.

The control component 108 may be configured to generate sound control information and/or other information. The sound control information may include sound control signals that dictate changes in the configurations of the components of the remote-controlled vehicle 118 to cause the remote-controlled vehicle 118 to produce sounds in the set of sounds during operation without altering the path of the remote-controlled vehicle 118. By way of non-limiting illustration, the changes in the configurations of the components of the remote-controlled vehicle 118 may be effectuated without altering one or more of an amount of thrust, a direction of travel, an orientation of the remote-controlled vehicle 118, and/or other aspects of the control of the remote-controlled vehicle 118 along a path.

In some implementations, the sound control signals may include and/or may be accompanied by additional control signals that dictate control of components of remote-controlled vehicle 118 to counteract the effects of the changes in the configurations of the components of the remote-controlled vehicle 118. The additional control signals may dictate control of components of remote-controlled vehicle 118 to counteract the effects of the changes in the configurations of the components of the remote-controlled vehicle 118 to ensure the navigation along the path may be unaffected.

In some implementations, the sound control information may be generated based on one or more of the sound profile information, the sound production information, and/or other information. The sound production information may specify a set of sounds. The sound production information may specify a temporal order, cadence, and/or rhythm in which the individual sounds in the set of sounds are to be produced. The sound profile information may be queried to determine a series of configurations of components of remote-controlled vehicle 118 that may be needed to reproduce the individual sounds in the set of sounds in accordance with one or more of temporal order, cadence, and/or rhythm in which the sounds are to be produced. The control component 108 may then generate and/or queue up the requisite sound control signals to dictate changes in the configurations of the components to produce the sounds in the set of sounds in accordance with one or more of temporal order, cadence, and/or rhythm in which the sounds are to be produced.

In some implementations, individual sounds in the set of sounds may be specified by, or characterized by, one or more values of the one or more attributes of sound described herein. Since the sound produced by remote-controlled vehicle 118 and the set of sounds may be characterized in the same or similar manner, the required configurations causing the sounds that match the set of sounds may be quickly ascertained.

The control component 108 may be configured to effectuate transmission of one or more control signals and/or one or more sound control signals to the remote-controlled vehicle 118. The one or more sound control signals may be transmitted to remote-controlled vehicle 118 so that the remote-controlled vehicle 118 produces the sounds in the set of sounds during operation without altering the path of the remote-controlled vehicle. In some implementations, control signals which counteract effects of the changes dictated by the sound control signals may be sent concurrently with the sound control signals. By way of non-limiting illustration, responsive to the set of sounds including sound having the first value of the first attribute, the control component 108 may effectuate transmission of a first sound control signal and/or other control signals to the remote-controlled vehicle. The first sound control signal and/or other sound control signals may cause the remote-controlled vehicle to be configured in the first configuration to produce sound having the first value of the first attribute. By way of non-limiting illustration, responsive to the set of sounds including sound having the second value of the first attribute, the control component 108 may effectuate transmission of a second sound control signal and/or other sound control signals to the remote-controlled vehicle to cause the remote-controlled vehicle to be configured in the second configuration to produce sound having the second value of the first attribute.

The feedback component 110 may be configured to obtain output signals from the one or more sensors 132 conveying audio information, vibration information, pressure information, and/or other information. The audio information may define sounds being produced by the remote-controlled vehicle 118 during operation. The feedback component 110 may be configured to compare the audio information to the set of sounds to be produced by the remote-controlled vehicle during operation of the remote-controlled vehicle. The feedback component 110 may be configured to determine differences between the audio information and the set of sounds. In some implementations, the audio information defining sounds being produced by the remote-controlled vehicle 118 during operation may be characterized by one or more values of the one or more attributes of sound described herein. The comparison may include comparing individual values of individual attributes of the sound produced by the remote-controlled vehicle 118 during operation with individual values of the same individual attributes of the sounds in the set of sounds. In some implementations, differences between the audio information and the set of sounds may include differences between the respective values of the respective attributes of sounds. By way of non-limiting illustration, a value of a first attribute of sound may be measured while the remote-controlled vehicle 118 is in the first configuration during operation. The value may be compared to a first sound in the set of sounds having the second value of the first attribute. In some implementations, a difference between the first value and the second value may be determined.

The feedback component 110 may be configured to determine one or more additional sound control signals that may cause configurations of the components of the remote-controlled vehicle to be changed to reduce and/or eliminate the differences. In some implementations, the additional sound control signals may dictate changes in the configurations of the components of the remote-controlled vehicle 118 to cause remote-controlled vehicle 118 to produce individual values of individual attributes of the sound during operation according to the identified differences in order to reduce and/or eliminate the differences.

In some implementations, the operations of feedback component 110 may be performed continuously overtime, at predetermined intervals, in response to a request by an operator of remote-controlled vehicle 118, and/or at other points in time.

Figure 3:
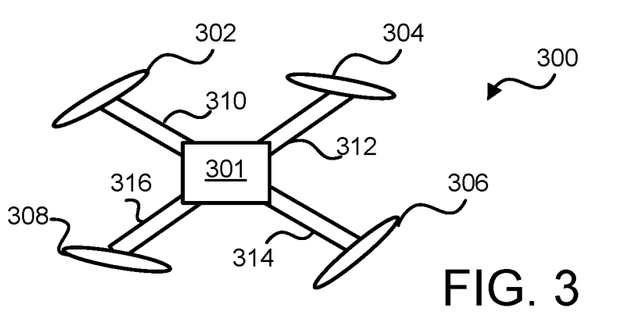
FIG. 3 illustrates an implementation of a remote-controlled vehicle.

FIG. 3 illustrates an implementation of a remote-controlled vehicle 300. The remote-controlled vehicle 300 may include one or more drive components, one or more structural components, and/or other components. The one or more structural components may be configured to mechanically connect and/or engage components together to form the remote-controlled vehicle 300. The one or more drive components may be configured to propel the remote-controlled vehicle 300 along a navigation path. The one or more drive components may include one or more of a first set of drive components 302, a second set of drive components 304, a third set of drive components 306, a fourth set of drive components 308, and/or other drive components. The one or more structural components may include one or more of a body 301, a first set of structural components 310, a second set of structural components 312, a third set of structural components 314, a fourth set of structural component 316, and/or other components. The first set of structural components 310 may comprise one or more arm members and/or one or more mounting components configured to attach the first set of drive components 302 to the body 301. The second set of structural components 312 may comprise one or more arm members and/or one or more mounting components configured to attach the second set of drive components 304 to the body 301. The third set of structural components 314 may comprise one or more arm members and/or one or more mounting components configured to attach the third set of drive components 306 to the body 301. The fourth set of structural components 316 may comprise one or more arm members and/or one or more mounting components configured to attach the fourth set of drive components 308 to the body 301.

Figure 4:
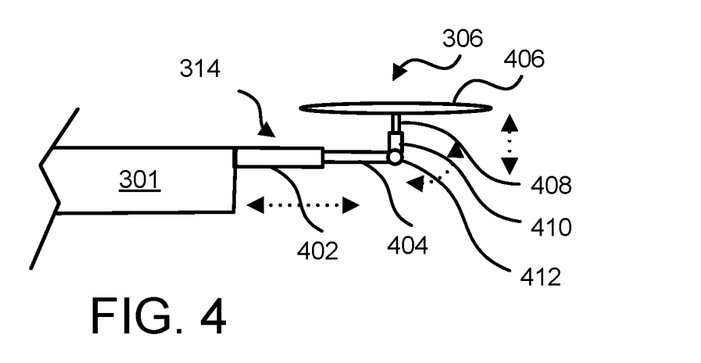
FIG. 4 illustrates an implementation of a remote-controlled vehicle.

FIG. 4 illustrates a side view of the remote-controlled vehicle 300 in FIG. 3 showing the third set of structural components 314 and the third set of drive components 306 in more detail. It is noted that the first set of structural components 310, the second set of structural components 312, and the fourth set of structural components 316 may be configured in the same or similar manner as the third set of structural components 314. Further, it is noted that the first set of drive components 302, the second set of drive components 304, and fourth set of drive components 308 may be configured in the same or similar manner as the third set of drive components 306.

In FIG. 4, the third set of structural components 314 may include one or more arm members and/or one or more mounting components. The one or more arm members may include one or more of a first arm member 402, a second arm member 404, and/or other arm members. The one or more mounting components may include a first mounting component 412 and/or other components. The first mounting component 412 may comprise a rotatable hinge. The third set of drive components 306 may include one or more of a propeller 406, a drive shaft 408, a drive motor 410, and/or other components.

In some implementations, the first arm member 402 may be translatably engaged to the second arm member 404. By way of non-limiting illustration, the first arm member 402 and the second arm member 404 may be telescopically engaged. A configuration of the third set of structural components 314 may be changed to change a sound produced during operation of remote-controlled vehicle 118. By way of non-limiting illustration, the length of the third set of structural components 314 may be changed by translating the second arm member 404 into first arm member 402 (to shorten and/or widen the diameter of the third set of structural components 314) and/or translating the second arm member 404 away from first arm member 402 (to lengthen the third set of structural components 314). One or more actuators, gears, and/or other components (not shown) may be included to facilitate such translation.

In some implementations, a configuration of the third set of drive components 306 may be changed to change a sound produced during operation of remote-controlled vehicle 118. By way of non-limiting illustration, the drive motor 410 may be driven faster and/or slower to change the sound produced by the drive motor 410 during operation. By way of non-limiting illustration, a pitch of the propeller 406 may be changed to change the sound produced during operation. By way of non-limiting illustration, the drive shaft 408 may be lengthened and/or shortened to change the sound produced during operation. In some implementations, the drive shaft 408 may be translatably engaged to drive motor 410 to facilities extending or retracting the drive shaft 408 into and out of the driver motor 410. In some implementations, a configuration of propeller 406, drive shaft 408, and/or drive motor 410 relative the third set of structural components 314 may be changed, and/or the third set of structural components 314 may be changed to change a sound produced during operation of remote-controlled vehicle 118. By way of non-limiting illustration, propeller 406, drive shaft 408, and/or drive motor 410 may be rotated about first mounting component 412 to change a direction of air flow during operation. One or more actuators, gears, and/or other components (not shown) may be included to facilitate such rotation.

Figures 5, 6:
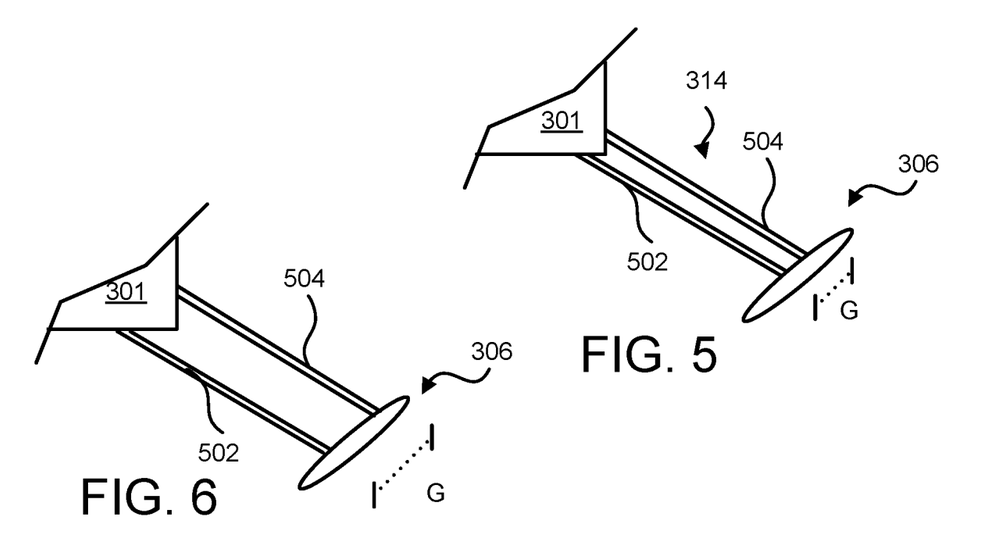
FIG. 5 illustrates an implementation of a remote-controlled vehicle.
FIG. 6 illustrates an implementation of a remote-controlled vehicle.

FIGS. 5 and 6 show another implementation of remote-controlled vehicle 118. In particular, FIGS. 5 and 6 show a top view of another implementation of third set of structural components 314 and the third set of drive components 306 in more detail. It is noted that the first set of structural components 310, the second set of structural components 312, and the fourth set of structural components 316 may be configured in the same or similar manner as the third set of structural components 314.

In FIG. 5, the third set of structural components 314 may include one or more arm members and/or other components. The one or more arm members may include one or more of a first arm member 502, a second arm member 504, and/or other arm members. The one or more arm members may attach the third set of drive components 306 to body 301. The first arm member 502 and the second arm member 504 may comprise rods, shafts, and/or other structural components. The first arm member 502 and the second arm member 504 may be disposed and arranged parallel, or substantially parallel, to each other. The first arm member 502 and the second arm member 504 may be configured to define a gap distance, "G," between the two. The first arm member 502 and the second arm member 504 may be attached to the body 301 and the third set of drive components 306 in a manner that facilitates widening and/or narrowing of the gap distance, "G," between the first arm member 502 and the second arm member 504. For example, air being driver over the first arm member 502 and the second arm member 504 by the third set of drive components 306 may make different sounds depending on the gap distance G. One or more actuators, gears, and/or other components (not shown) may be included to facilitate such widening and/or narrowing. FIG. 6 shows a configuration where the gap distance G has been widened compared to FIG. 5.

Figures 7, 8, 9, 10:
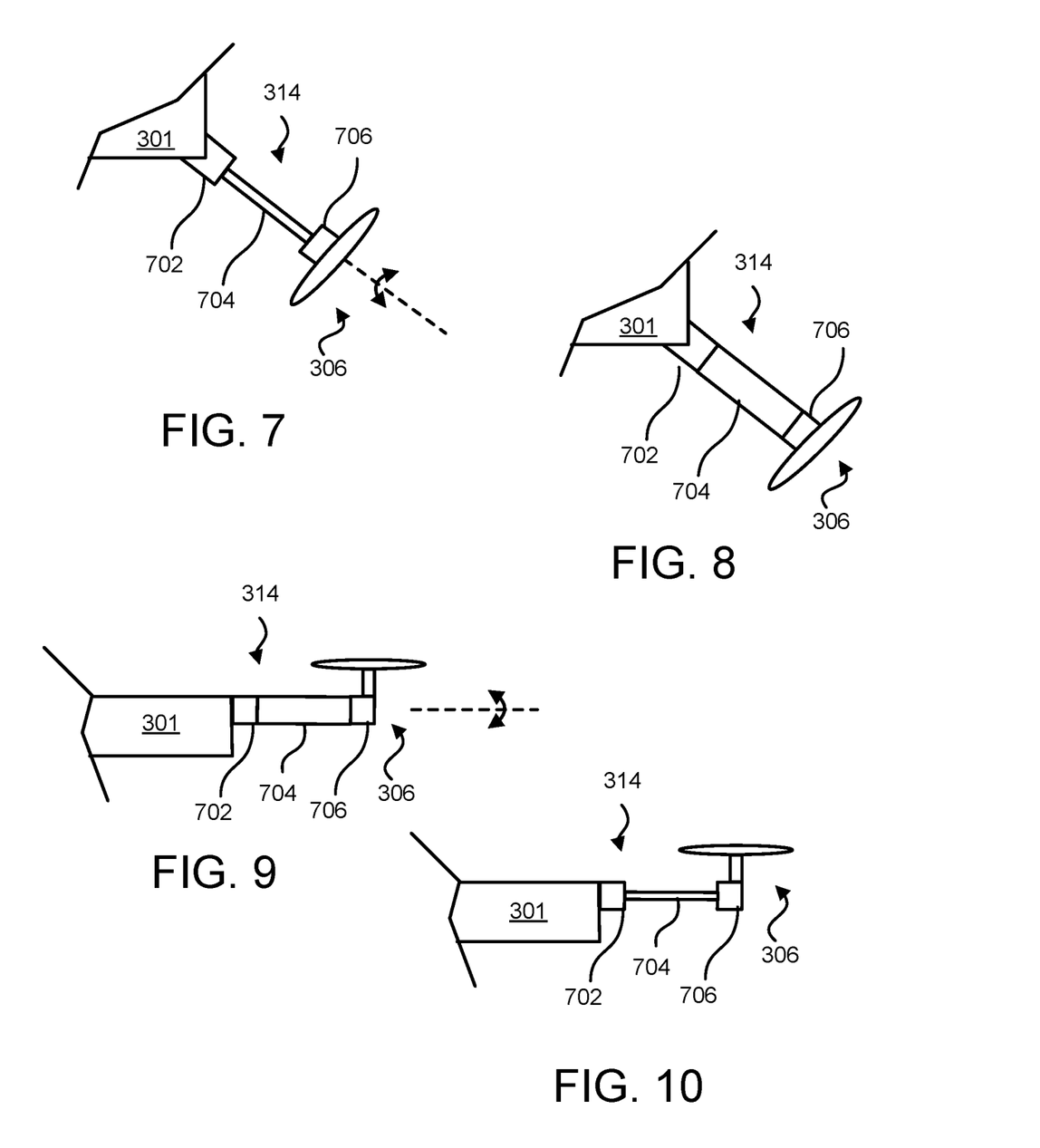
FIG. 7 illustrates an implementation of a remote-controlled vehicle.
FIG. 8 illustrates an implementation of a remote-controlled vehicle.
FIG. 9 illustrates an implementation of a remote-controlled vehicle.
FIG. 10 illustrates an implementation of a remote-controlled vehicle.

FIGS. 7-12 show other implementations of remote-controlled vehicle 118. In particular, FIGS. 7-8 show a top view, and FIGS. 9-10 show a side view, of another implementation of third set of structural components 314 and the third set of drive components 306 in more detail. In particular, the implementation of third set of structural components 314 in FIGS. 7-10 may allow for an arm member to be rotated. The rotation may be performed about an axis running parallel to, and/or aligned with, the third set of structural components 314. The different rotated positions may define different surface areas of material that may disposed at or near the flow of air driven by the third set of drive components 306. By changing the surface area of an arm member where air flows over during operation, the sounds produced may be changed. It is noted that the first set of structural components 310, the second set of structural components 312, and the fourth set of structural components 316 may be configured in the same or similar manner as the third set of structural components 314.

In FIG. 7, the third set of structural components 314 may include one or more arm members and/or other components.

The one or more arm members may include a first arm member 702, a second arm member 704, a third arm member 706, and/or other component. The first arm member 702, second arm member 704, and/or third arm member 706 may comprise rods, shafts, baffles, supports, and/or other structural components. The second arm member 704 may be configured to rotate relative to the first arm member 702 and/or third arm member 706. FIGS. 7 and 9 show a first rotated position of the second arm member 704 defining a first configuration of the third set of structural components 314. FIGS. 8 and 10 show a second rotated position of the second arm member 704 defining a second configuration of the third set of structural components 314. In operation, air being driven over the third set of structural components 314 may make different sounds depending on the rotated position of second arm member 706. One or more actuators, gears, and/or other components (not shown) may be included to facilitate such rotation. In some implementations, one or more components the same as or similar to second arm member 704 may be positioned and/or mounted at and/or below third set of drive components 306 to act as a thrust vectoring fins to decouple sound from thrust.

Figure 11:
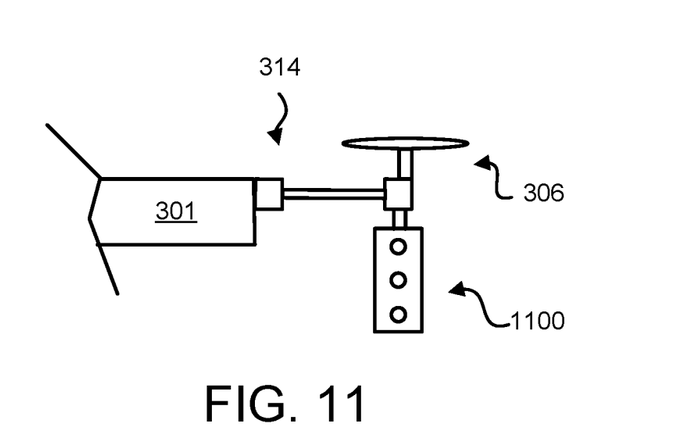
FIG. 11 illustrates an implementation of a remote-controlled vehicle.

FIG. 11 illustrates an implementation including a first sound-specific component 1100. The first sound-specific component 1100 may include a flute and/or flute component. The first sound-specific component 1100 may be positioned to actively receive the flow of air driven by a third set of drive components 306. In some implementations, the first sound-specific component 1100 may be positioned to passively receive the flow of air passing by the vehicle during flying operation.

Figure 12:
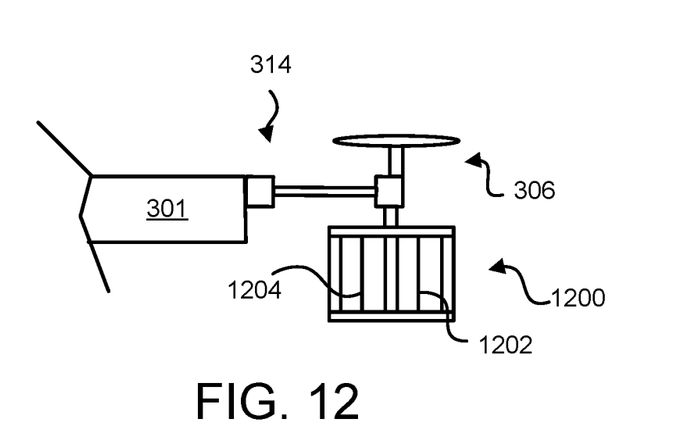
FIG. 12 illustrates an implementation of a remote-controlled vehicle.

FIG. 12 illustrates an implementation including a second sound-specific component 1200. The second sound-specific component 1200 may include a stringed instrument and/or other instruments. By way of non-limiting illustration, the second sound-specific component 1200 may include a string assembly including one or more of a first string 1202, a second string 1204, and/or other strings mounted within the assembly. In some implementations, the second sound-specific component 1200 may be positioned to actively receive the flow of air driven by a third set of drive components 306. In some implementations, the second sound-specific component 1200 may be positioned to passively receive the flow of air passing by the vehicle during flying operation.

It is noted that the depictions in FIG. 3-12 and accompanying descriptions are provided for illustrative purposes only and are not to be considered limiting. By way of non-limiting illustration, in other implementations, an remote-controlled vehicle may include other components that may be manipulated in other ways to change the sound produced by the remote-controlled vehicle 118.

Returning to FIG. 1, one or more processor(s) 102, user interface 116, remote-controlled vehicle 118, and/or external resource(s) 120 may be operatively linked via one or more electronic communication links. For example, such electronic communication links may be established, at least in part, via network(s) 114, such as one or more of a WiFi network, Bluetooth, the Internet, and/or other networks. It will be appreciated that this is not intended to be limiting and that the scope of this disclosure includes implementations in which one or more processor(s) 102, user interface 116, remote-controlled vehicle 118, and/or external resource(s) 120 may be operatively linked via some other communication media.

The external resource(s) 120 may include sources of sound production information and/or other information, hosts, and/or providers of outside of system 100, external entities participating with system 100, and/or other resources. In some implementations, some or all of the functionality attributed herein to external resource(s) 120 may be provided by resources included in system 100.

The processor(s) 102 may include communication lines or ports to enable the exchange of information within system 100. Illustration of processor(s) 102 in FIG. 1 is not intended to be limiting. The processor(s) 102 may include a plurality of hardware, software, and/or firmware components operating together to provide the functionality attributed herein to processor(s) 102. For example, processor(s) 102 may be implemented by a cloud of computing platforms operating together as processor(s) 102.

Electronic storage 112 and/or 136 may comprise electronic storage media that electronically stores information. The electronic storage media of electronic storage 112 and/or 136 may include one or both of storage that is provided integrally (i.e., substantially non-removable) with respective ones of processor(s) 102 and/or remote-controlled vehicle 118 and/or removable storage that is removably connectable respective ones of processor(s) 102 and/or remote-controlled vehicle 118 via, for example, a port or a drive. A port may include a USB port, a firewire port, and/or other port. A drive may include a disk drive and/or other drive. Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private network, and/or other virtual storage resources). Electronic storage 112 and/or 136 may individually store software algorithms, information determined by respective ones of processor(s) 102 and/or remote-controlled vehicle 118, information received from other ones of processor(s) 102 and/or remote-controlled vehicle 118, and/or other information that enables individual ones of processor(s) 102 and/or remote-controlled vehicle 118 to function as described herein.

By way of non-limiting example, processor(s) 102 may include one or more of a physical processor, a digital processor, an analog processor, a digital circuit designed to process information, an analog circuit designed to process information, a state machine, and/or other mechanisms for electronically processing information. Although processor(s) 102 is shown in FIG. 1 as a single entity, this is for illustrative purposes only. In some implementations, processor(s) 102 may include one or more processing units. These processing units may be physically located within the same device, or processor(s) 102 may represent processing functionality of a plurality of devices operating in coordination. The processor(s) 102 may be configured to execute components 106, 108, and/or 110. Processor(s) 102 may be configured to execute components 106, 108, and/or 110 by software; hardware; firmware; some combination of software, hardware, and/or firmware; and/or other mechanisms for configuring processing capabilities on processor(s) 102.

It should be appreciated that although components 106, 108, and/or 110 are illustrated in FIG. 1 as being co-located within a single processing unit, in implementations in which processor(s) 102 includes multiple processing units, one or more of components 106, 108, and/or 110 may be located remotely from the other components. The description of the functionality provided by the different components 106, 108, and/or 110 described above is for illustrative purposes and is not intended to be limiting, as any of components 106, 108, and/or 110 may provide more or less functionality than is described. For example, one or more of components 106, 108, and/or 110 may be eliminated, and some or all of its functionality may be provided by other ones of components 106, 108, 110, and/or other components. As another example, processor(s) 102 may be configured to execute one or more additional components that may perform some or all of the functionality attributed below to one of components 106, 108, and/or 110.

Figure 2:
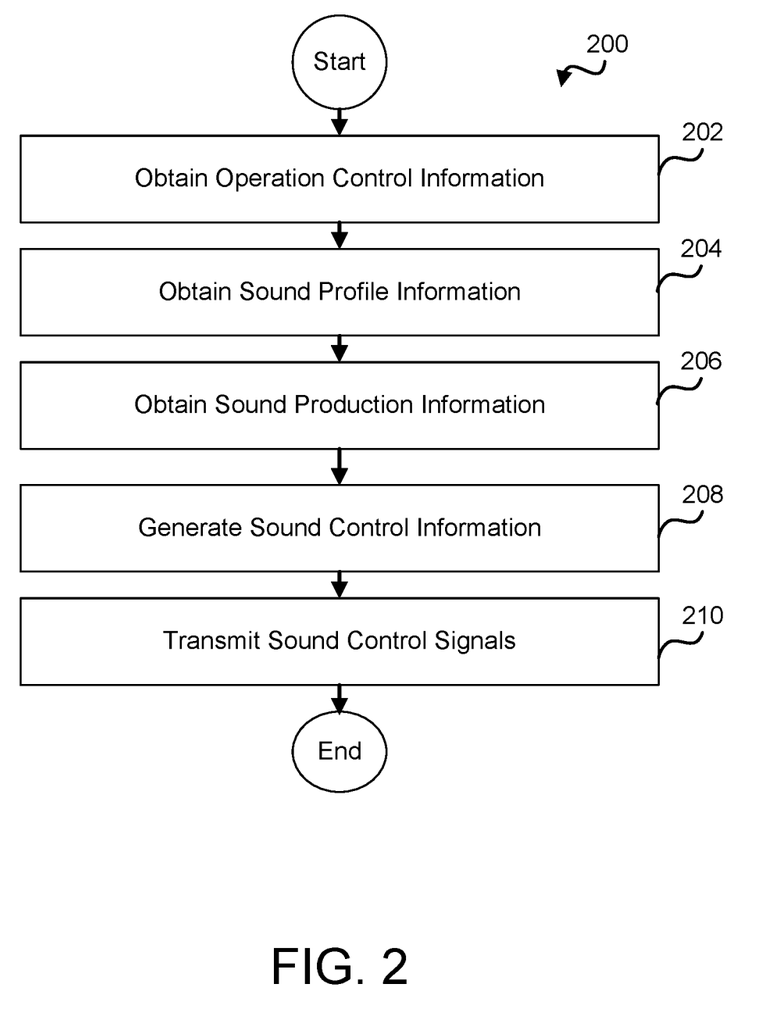
FIG. 2 illustrates a method to control sounds produced by a remote-controlled vehicle during operation of the remote-controlled vehicle, in accordance with one or more implementations.

FIG. 2 illustrates a method 200 to control sounds produced by a remote-controlled vehicle during operation of the remote-controlled vehicle. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in system comprising one or more of one or more processing devices (e.g., a digital processor, an analog processor, a digital circuit designed to process information, an analog circuit designed to process information, a state machine, and/or other mechanisms for electronically processing information), storage media storing machine-readable instructions, one or more RC vehicles, one or more user interfaces, and/or other components. By way of non-limiting illustration, method 200 may be implemented using system 100 of FIG. 1. The one or more processing devices may include one or more devices executing one or more operations of method 200 in response to instructions stored electronically on electronic storage media. The one or more processing devices may include one or more devices configured through hardware, firmware, and/or software to be specifically designed for execution of one or more of the operations of method 200.

At an operation 202, operation control information may be obtained. The operation control information may include control signals that dictate one or more of an amount of thrust, a direction of travel, and/or an orientation of a remoted controlled vehicle. In some implementations, operation 202 may be performed by one or more physical processors executing a control component the same as or similar to the control component 108 (shown in FIG. 1 and described herein).

At an operation 204, sound profile information may be obtained. The sound profile information may specify associations between configurations of components of the remote-controlled vehicle and one or more values of one or more attributes of sound produced by the remote-controlled vehicle during operation of the remote-controlled vehicle. By way of non-limiting illustration, the sound profile information may specify one or more of a first association between a first configuration and a first value of a first attribute of sound, a second association between a second configuration and a second value of the first attribute of sound, and/or other associations. In some implementations, operation 204 may be performed by one or more physical processors executing a sound component the same as or similar to the sound component 106 (shown in FIG. 1 and described herein).

At an operation 206, sound production information may be obtained. The sound production information may specify a set of sounds to be produced by the remote-controlled vehicle during operation of the remote-controlled vehicle. In some implementations, operation 206 may be performed by one or more physical processors executing a sound component the same as or similar to the sound component 106 (shown in FIG. 1 and described herein).

At an operation 208, sound control information may be generated. The sound control information may include sound control signals that dictate changes in the configurations of the components of the remote-controlled vehicle to cause the remote-controlled vehicle to produce the sounds in the set of sounds during operation without altering the path of the remote-controlled vehicle. In some implementations, operation 208 may be performed by one or more physical processors executing a sound component the same as or similar to sound component 106 (shown in FIG. 1 and described herein).

At an operation 210, transmission may be effectuated of the sound control signals to the remote-controlled vehicle so that the remote-controlled vehicle produces the sounds in the set of sounds during operation without altering the path of the remote-controlled vehicle. In some implementations, operation 210 may be performed by one or more physical processors executing a control component the same as or similar to the control component 108 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to control sounds produced by a remote-controlled vehicle during operation of the remote-controlled vehicle, the system comprising:
one or more physical processors configured by machine readable instructions to:
obtain operation control information, the operation control information including control signals that dictate one or more of an amount of thrust, a direction of travel, and/or an orientation of a remote-controlled vehicle;
obtain sound profile information, the sound profile information specifying associations between configurations of components of the remote-controlled vehicle and one or more values of one or more attributes of sound produced by the remote-controlled vehicle during operation of the remote-controlled vehicle;
obtain sound production information, the sound production information specifying a set of sounds to be produced by the remote-controlled vehicle during the operation of the remote-controlled vehicle;
generate sound control information, the sound control information including sound control signals that dictate changes in the configurations of the components of the remote-controlled vehicle to cause the remote-controlled vehicle to produce sounds in the set of sounds during the operation without altering one or more of the amount of thrust, the direction of travel, and/or the orientation of the remote-controlled vehicle; and effectuate transmission of the sound control signals to the remote-controlled vehicle so that the remote-controlled vehicle produces the sounds in the set of sounds during the operation without altering one or more of the amount of thrust, the direction of travel, and/or the orientation of the remote-controlled vehicle;

one or more sensors coupled to the remote-controlled vehicle, the one or more sensors being configured to generate output signals conveying audio information, the audio information defining the sounds produced by the remote-controlled vehicle during the operation; and wherein the one or more physical processors are further configured by the machine-readable instructions to:

obtain the output signals conveying the audio information;

compare the audio information to the set of sounds to be produced by the remote-controlled vehicle during the operation of the remote-controlled vehicle;

determine differences between the audio information and the set of sounds; and effectuate transmission of one or more additional sound control signals to the remote-controlled vehicle so that the configurations of the components of the remote-controlled vehicle are changed to reduce and/or eliminate the differences.

2. The system of claim 1, wherein the changes to the configurations of the components of the remote-controlled vehicle include causing mechanical adjustments to physical components of the remote-controlled vehicle that do not alter one or more of the amount of thrust, the direction of travel, and/or the orientation of the remote-controlled vehicle.

3. The system of claim 1, wherein the remote-controlled vehicle is a flying vehicle.

4. The system of claim 1, wherein the one or more attributes of sound include one or more of pitch, tone, volume, key, timbre, or intensity.

5. The system of claim 1, wherein the operation control information is obtained from a user interface configured to receive user input.

6. The system of claim 5, wherein the one or more physical processor are included in the user interface.

7. A system configured to control sounds produced by a remote-controlled vehicle during operation of the remote-controlled vehicle, the system comprising:

one or more physical processors configured by machine readable instructions to:

obtain operation control information, the operation control information including control signals that dictate one or more of an amount of thrust, a direction of travel, and/or an orientation of a remote-controlled vehicle;

obtain sound profile information, the sound profile information specifying associations between configurations of components of the remote-controlled vehicle and one or more values of one or more attributes of sound produced by the remote-controlled vehicle during operation of the remote-controlled vehicle;

obtain sound production information, the sound production information specifying a set of sounds to be produced by the remote-controlled vehicle during the operation of the remote-controlled vehicle;

generate sound control information, the sound control information including sound control signals that dictate changes in the configurations of the components of the remote-controlled vehicle to cause the remote-controlled vehicle to produce sounds in the set of sounds during the operation without altering one or more of the amount of thrust, the direction of travel, and/or the orientation of the remote-controlled vehicle; and effectuate transmission of the sound control signals to the remote-controlled vehicle so that the remote-controlled vehicle produces the sounds in the set of sounds during the operation without altering one or more of the amount of thrust, the direction of travel, and/or the orientation of the remote-controlled vehicle;

wherein the sound profile information specifies a first association between a first configuration and a first value of a first attribute of sound, and a second association between a second configuration and a second value of the first attribute of sound; and wherein the one or more physical processors are further configured by the machine-readable instructions to:

responsive to the set of sounds including sound having the first value of the first attribute, effectuate transmission of a first sound control signal to the remote-controlled vehicle to cause the remote-controlled vehicle to be configured in the first configuration to produce the sound having the first value of the first attribute without altering one or more of the amount of thrust, the direction of travel, and/or the orientation of the remote-controlled vehicle;

responsive to the set of sounds including sound having the second value of the first attribute, effectuate transmission of a second sound control signal to the remote-controlled vehicle to cause the remote-controlled vehicle to be configured in the second configuration to produce the sound having the second value of the first attribute without altering one or more of the amount of thrust, the direction of travel, and/or the orientation of the remote-controlled vehicle; and wherein the set of sounds includes temporal attributes dictating temporal occurrence of the sounds within the set of sounds, such that the set of sounds includes the sound having the first value of the first attribute occurring temporally before the sound having the second value of the first attribute, and wherein the first sound control signal is transmitted to the remote-controlled vehicle prior to the second sound control signal.

8. The system of claim 1, wherein the set of sounds produce a song.

9. The system of claim 1, wherein the one or more physical processor are included in the remote-controlled vehicle.

10. A method to control sounds produced by a remote-controlled vehicle during operation of the remote-controlled vehicle, the method comprising:

obtaining operation control information, the operation control information including control signals that dictate one or more of an amount of thrust, a direction of travel, and/or an orientation of a remote-controlled vehicle;

obtaining sound profile information, the sound profile information specifying associations between configurations of components of the remote-controlled vehicle and one or more values of one or more attributes of sound produced by the remote-controlled vehicle during operation of the remote-controlled vehicle;

obtaining sound production information, the sound production information specifying a set of sounds to be produced by the remote-controlled vehicle during the operation of the remote-controlled vehicle;

generating sound control information, the sound control information including sound control signals that dictate changes in the configurations of the components of the remote-controlled vehicle to cause the remote-controlled vehicle to produce sounds in the set of sounds during the operation without altering one or more of the amount of thrust, the direction of travel, and/or the orientation of the remote-controlled vehicle;

effectuating transmission of the sound control signals to the remote-controlled vehicle so that the remote-controlled vehicle produces the sounds in the set of sounds during the operation without altering one or more of the amount of thrust, the direction of travel, and/or the orientation of the remote-controlled vehicle;

obtaining audio information, the audio information defining the sounds produced by the remote-controlled vehicle during the operation;

comparing the audio information to the set of sounds to be produced by the remote-controlled vehicle during the operation of the remote-controlled vehicle;

determining differences between the audio information and the set of sounds; and effectuating transmission of one or more additional sound control signals to the remote-controlled vehicle so that the configurations of the components of the remote-controlled vehicle are changed to reduce and/or eliminate the differences.

11. The method of claim 10, wherein the changes to the configurations of the components of the remote-controlled vehicle include causing mechanical adjustments to physical components of the remote-controlled vehicle that do not alter one or more of the amount of thrust, the direction of travel, and/or the orientation of the remote-controlled vehicle.

12. The method of claim 10, wherein the remote-controlled vehicle is a flying vehicle.

13. The method of claim 10, wherein the one or more attributes of sound include one or more of pitch, tone, volume, key, timbre, or intensity.

14. The method of claim 10, wherein the operation control information is obtained from a user interface configured to receive user input.

15. The method of claim 14, wherein the method is implemented in the user interface.

16. A method to control sounds produced by a remote-controlled vehicle during operation of the remote-controlled vehicle, the method comprising:

obtaining operation control information, the operation control information including control signals that dictate one or more of an amount of thrust, a direction of travel, and/or an orientation of a remote-controlled vehicle;

obtaining sound profile information, the sound profile information specifying associations between configurations of components of the remote-controlled vehicle and one or more values of one or more attributes of sound produced by the remote-controlled vehicle during operation of the remote-controlled vehicle;

obtaining sound production information, the sound production information specifying a set of sounds to be produced by the remote-controlled vehicle during the operation of the remote-controlled vehicle;

generating sound control information, the sound control information including sound control signals that dictate changes in the configurations of the components of the remote-controlled vehicle to cause the remote-controlled vehicle to produce sounds in the set of sounds during the operation without altering one or more of the amount of thrust, the direction of travel, and/or the orientation of the remote-controlled vehicle;

effectuating transmission of the sound control signals to the remote-controlled vehicle so that the remote-controlled vehicle produces the sounds in the set of sounds during the operation without altering one or more of the amount of thrust, the direction of travel, and/or the orientation of the remote-controlled vehicle;

wherein the sound profile information specifies a first association between a first configuration and a first value of a first attribute of sound, and a second association between a second configuration and a second value of the first attribute of sound; and wherein the method further comprises:

responsive to the set of sounds including sound having the first value of the first attribute, effectuating transmission of a first sound control signal to the remote-controlled vehicle to cause the remote-controlled vehicle to be configured in the first configuration to produce the sound having the first value of the first attribute without altering one or more of the amount of thrust, the direction of travel, and/or the orientation of the remote-controlled vehicle;

responsive to the set of sounds including sound having the second value of the first attribute, effectuating transmission of a second sound control signal to the remote-controlled vehicle to cause the remote-controlled vehicle to be configured in the second configuration to produce the sound having the second value of the first attribute without altering one or more of the amount of thrust, the direction of travel, and/or the orientation of the remote-controlled vehicle; and wherein the set of sounds includes temporal attributes dictating temporal occurrence of the sounds within the set of sounds, such that the set of sounds includes the sound having the first value of the first attribute occurring temporally before the sound having the second value of the first attribute, and wherein the first sound control signal is transmitted to the remote-controlled vehicle prior to the second sound control signal.

17. The method of claim 10, wherein the set of sounds produce a song.

18. The method of claim 10, wherein the method is implemented by the remote-controlled vehicle.

* * * * *